(12) United States Patent
Tamura et al.

(10) Patent No.: US 11,845,205 B2
(45) Date of Patent: Dec. 19, 2023

(54) METHOD FOR PRODUCING GEAR, GEAR, AND BENDING MESHING TYPE GEAR DEVICE

(71) Applicant: SUMITOMO HEAVY INDUSTRIES, LTD., Tokyo (JP)

(72) Inventors: Mitsuhiro Tamura, Kanagawa (JP); Akira Yamamoto, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 191 days.

(21) Appl. No.: 17/322,224

(22) Filed: May 17, 2021

(65) Prior Publication Data
US 2021/0354348 A1 Nov. 18, 2021

(30) Foreign Application Priority Data
May 18, 2020 (JP) ................................. 2020-086400

(51) Int. Cl.
| | | |
|---|---|---|
| B29C 45/00 | (2006.01) | |
| F16H 49/00 | (2006.01) | |
| F16H 55/08 | (2006.01) | |
| F16H 55/06 | (2006.01) | |
| B29L 15/00 | (2006.01) | |
| B29K 105/12 | (2006.01) | |

(52) U.S. Cl.
CPC ...... *B29C 45/0055* (2013.01); *B29C 45/0005* (2013.01); *F16H 49/001* (2013.01); *F16H 55/06* (2013.01); *F16H 55/0833* (2013.01); *B29C 2045/0058* (2013.01); *B29K 2105/12* (2013.01); *B29L 2015/003* (2013.01)

(58) Field of Classification Search
CPC .... F16H 49/001; F16H 55/06; F16H 55/0833; B29C 45/0055
See application file for complete search history.

(56) References Cited

U.S. PATENT DOCUMENTS

| | | | |
|---|---|---|---|
| 6,394,220 B1* | 5/2002 | Kurokawa | F16H 55/06 74/DIG. 10 |
| 10,105,914 B2 | 10/2018 | Kunishima | |
| 2001/0039730 A1 | 11/2001 | Fujita et al. | |
| 2002/0043124 A1 | 4/2002 | Shiga et al. | |
| 2011/0147112 A1* | 6/2011 | Suzuki | F16H 55/06 180/444 |
| 2016/0016368 A1 | 1/2016 | Kunishima | |
| 2017/0095950 A1 | 4/2017 | Brochot et al. | |

(Continued)

FOREIGN PATENT DOCUMENTS

| | | |
|---|---|---|
| CN | 103665851 A | 3/2014 |
| CN | 109695663 A | 4/2019 |

(Continued)

OTHER PUBLICATIONS

Translation CN-110293648-A, Oct. 2019.*

(Continued)

*Primary Examiner* — Terence Boes
(74) *Attorney, Agent, or Firm* — Michael Best & Friedrich LLP (57) ABSTRACT

Provided is a method for producing a gear including an intermediate product forming process of solidifying a fluid material to form a gear intermediate product, and a tooth forming process of cutting the gear intermediate product to form teeth.

16 Claims, 4 Drawing Sheets

(56) References Cited

U.S. PATENT DOCUMENTS

| | | |
|---|---|---|
| 2017/0334110 A1 | 11/2017 | Kunishima et al. |
| 2018/0266533 A1* | 9/2018 | Tamura ................ F16H 49/001 |
| 2019/0099931 A1 | 4/2019 | Sakamaki et al. |
| 2019/0176418 A1 | 6/2019 | Richter et al. |

FOREIGN PATENT DOCUMENTS

| | | | | |
|---|---|---|---|---|
| CN | 110107655 A | | 8/2019 | |
| CN | 110293648 A | * | 10/2019 | ......... B29C 45/0001 |
| DE | 10119235 A1 | | 10/2001 | |
| DE | 102011051386 A1 | | 1/2013 | |
| DE | 102016115043 A1 | | 2/2018 | |
| DE | 102020102403 A1 | * | 8/2020 | .............. B23P 15/00 |
| EP | 3 266 585 A1 | | 1/2018 | |
| JP | 2004-052840 A | | 2/2004 | |
| JP | 2005-188740 A | | 7/2005 | |
| JP | 2012-250381 A | | 12/2012 | |
| JP | 2016-023656 A | | 2/2016 | |
| JP | 2016-093910 A | | 5/2016 | |
| JP | 2017-205920 A | | 11/2017 | |
| JP | 2018-155313 A | | 10/2018 | |
| JP | 2019-025685 A | | 2/2019 | |
| JP | 2019-132363 A | | 8/2019 | |
| JP | 2021-008953 A | | 1/2021 | |

OTHER PUBLICATIONS

Office Action dated Feb. 15, 2022 for German Application No. 10 2021 110 900.0.

Office Action issued in Chinese Application No. 202110361872.0, dated Nov. 11, 2022.

\* cited by examiner

METHOD FOR PRODUCING GEAR, GEAR, AND BENDING MESHING TYPE GEAR DEVICE

RELATED APPLICATIONS

The content of Japanese Patent Application No. 2020-086400, on the basis of which priority benefits are claimed in an accompanying application data sheet, is in its entirety incorporated herein by reference.

BACKGROUND

Technical Field

A certain embodiment of the present invention relates to a method for producing a gear, a gear, and a bending meshing type gear device.

Description of Related Art

A gear made of a resin material containing a carbon fiber is disclosed in the related art. Since the carbon fiber length is 100 μm or less, even when the gear is a small gear, durability and abrasion resistance of the gear in the related are secured.

SUMMARY

According to an embodiment of the present invention, there is provided a method for producing a gear, the method including: an intermediate product forming process of solidifying a fluid material to form a gear intermediate product; and a tooth forming process of cutting the gear intermediate product to form teeth.

According to another embodiment of the present invention, there is provided a gear including: a fluid solidified portion of which an outer shape is formed by solidifying a fluid material; and a cut portion which has been cut. The cut portion includes teeth.

According to still another embodiment of the present invention, there is provided a bending meshing type gear device including: a wave generator; an external gear that is bendably deformed by the wave generator; and an internal gear that meshes with the external gear. The internal gear includes a fluid solidified portion of which an outer shape is formed by solidifying a fluid material, and a cut portion which has been cut. The cut portion includes teeth.

BRIEF DESCRIPTION OF THE DRAWINGS

FIGS. 2A and 2B are a second internal gear according to the embodiment of the present invention.

FIGS. 3A to 3C are views describing a process of producing the second internal gear.

DETAILED DESCRIPTION

When a gear is formed by solidifying a fluid material (for example, a resin material), various advantages such as a cost reduction can be obtained. Meanwhile, in a molding product formed by solidifying a fluid material, dimensional variations are likely to occur due to various factors during molding. When the gear formed by solidifying the fluid material is applied to a gear device, the accuracy required by the gear device may not be obtained.

It is desirable to provide a production method by which a gear with accuracy applicable to a gear device can be produced while having advantages of a molding product formed from a fluid material, and a gear. Further, it is also desirable to provide a bending meshing type gear device including such a gear.

Hereinafter, an embodiment of the present invention will be described in detail with reference to the drawings.

Figure 1:
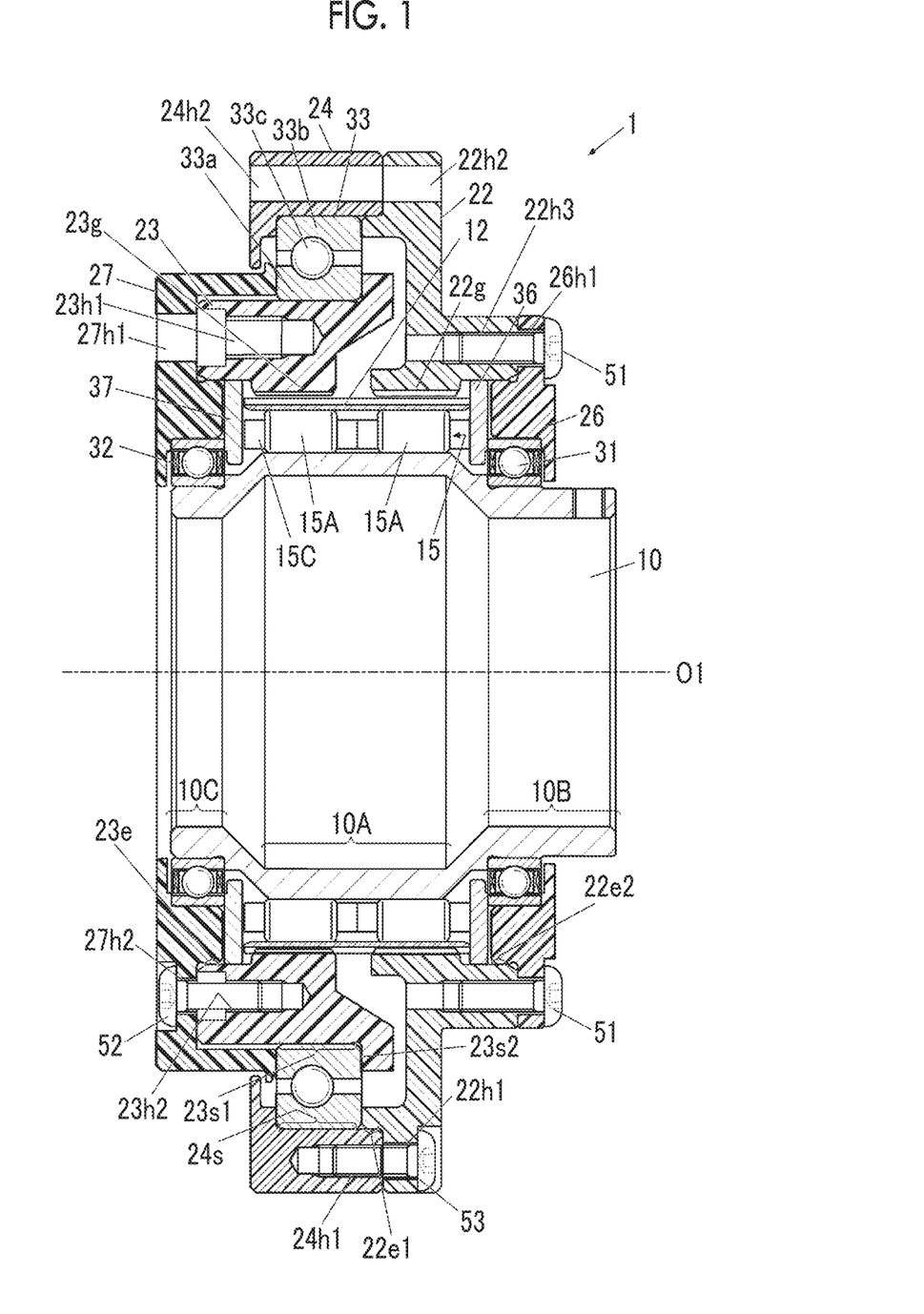
FIG. 1 is a view illustrating a bending meshing type gear device according to an embodiment of the present invention.

FIG. 1 is a cross-sectional view illustrating a bending meshing type gear device 1 according to the embodiment of the present invention. Hereinafter, a direction along a rotation axis O1 in FIG. 1 is called an "axial direction", a direction perpendicular to the rotation axis O1 is called a "radial direction", and a rotation direction around the rotation axis O1 is called a "circumferential direction". Further, in the axial direction, a second cover 27 side from which a reduced rotary motion is output is called an "output side", and an opposite side is called a "counter-output side".

The bending meshing type gear device 1 of FIG. 1 is a cylindrical bending meshing type gear device in which an external gear 12 is bendably deformed to transmit a rotary motion around the rotation axis O1. The bending meshing type gear device 1 includes a wave generator shaft 10, the external gear 12 that is bendably deformed by the wave generator shaft 10, a first internal gear 22 and a second internal gear 23 that mesh with the external gear 12, and a wave generator bearing 15. Further, the bending meshing type gear device 1 includes a casing 24, a first cover 26, a second cover 27, input bearings 31 and 32, and a main bearing 33.

The wave generator shaft 10 has a hollow shaft shape, and includes a wave generator 10A in which the outer shape of a cross section perpendicular to the rotation axis O1 is an elliptical shape, and shaft portions 10B and 10C which are provided on both sides in the axial direction of the wave generator 10A, and in which the outer shape of a cross section perpendicular to the rotation axis O1 is a circular shape. Incidentally, the elliptical shape is not limited to a geometrically perfect ellipse, and includes a substantial ellipse. The wave generator shaft 10 rotates around the rotation axis O1, and the center of the outer shape of a cross section of the wave generator 10A coincides with the rotation axis O1, the cross section being perpendicular to the rotation axis O1. The wave generator shaft 10 is an input shaft which is connected to a drive source (not illustrated) such as a motor, and to which driving force is input.

The external gear 12 is a cylindrical metallic member having bendability, and teeth are provided on an outer periphery of the external gear 12.

The wave generator bearing 15 is disposed between the wave generator 10A and the external gear 12. The wave generator bearing 15 includes a plurality of rolling elements (rollers) 15A, and a retainer 15C that retains the plurality of rolling elements 15A. The plurality of rolling elements 15A roll on an outer peripheral surface of the wave generator 10A and an inner peripheral surface of the external gear 12, which serve as rolling contact surfaces (also referred to as trajectory surfaces). Incidentally, the wave generator bearing 15 may include an inner ring separate from the wave generator 10A, an outer ring separate from the external gear 12, or both thereof.

Spacer rings 36 and 37 are provided on both sides in the axial direction of the retainer 15C of the wave generator bearing 15 and the external gear 12, as restricting members that are in contact with the external gear 12 and the retainer 15C to restrict movement thereof.

The first internal gear 22 and the second internal gear 23 include teeth 22g and 23g in inner peripheral portions thereof, respectively. The teeth 22g and 23g are arranged side by side in the axial direction, one of the teeth 22g and 23g meshes with teeth on one side in the axial direction of the external gear 12 with respect to the center, and the other meshes with teeth on the other side in the axial direction of the external gear 12 with respect to the center.

An outer peripheral portion of the first internal gear 22 functions as a casing, which covers the inside of the bending meshing type gear device 1, together with the casing 24. A portion that extends to be connected to the first cover 26 is provided on the counter-output side of the first internal gear 22, and the portion is provided with a connection hole 22h3 into which a connection member (bolt or the like, the same hereafter) 51 for connecting the first internal gear 22 to the first cover 26 is screwed. Further, the outer peripheral portion of the first internal gear 22 is provided with a connection hole 22h1 for connection to the casing 24 via a connection member 53, and a connection hole 22h2 for connection to an external support member by tightening together with the casing 24. Further, the first internal gear 22 has a fitting surface 22e1 that is spigot-fitted to the casing 24, and a fitting surface 22e2 that is spigot-fitted to the first cover 26. Female screws may be formed in the connection holes 22h1 to 22h3 when the connection members are screwed thereinto, and may not be formed when the connection members pass therethrough.

An outer peripheral portion of the second internal gear 23 has a mating surface 23s1 to which an inner ring 33a of the main bearing 33 is fixed, a contact surface 23s2 which determines the position of the inner ring 33a in the axial direction, a connection hole 23h1 for connection to an external member of a drive target, a connection hole 23h2 for connection to the second cover 27, and a fitting surface 23e which is spigot-fitted to the second cover 27.

The casing 24 is connected to the first internal gear 22 via the connection member 53. The casing 24 covers, together with the first internal gear 22, an outer side in the radial direction of a portion in which the teeth 22g and 23g of the first internal gear 22 and the second internal gear 23 mesh with the external gear 12. The casing 24 has a mating surface 24s to which an outer ring 33b of the main bearing 33 is fixed, a connection hole 24h1 into which the connection member 53 is screwed, and a connection hole 24h2 which communicates with the connection hole 22h2 of the first internal gear 22.

The first cover 26 covers an outer peripheral portion on the counter-output side of the wave generator shaft 10. The first cover 26 has a connection hole 26h1 communicating with the connection hole 22h1 of the first internal gear 22, and is connected to the first internal gear 22 via the connection member 51.

The second cover 27 covers an outer peripheral portion on the output side of the wave generator shaft 10. The second cover 27 has connection holes 27h1 and 27h2 that communicate with the connection holes 23h1 and 23h2 of the second internal gear 23, respectively. The connection hole 27h1 is a through-hole that is located between the external member of the drive target and the second internal gear 23 to allow the second cover 27 to be tightened therewith. The connection hole 27h2 is a through-hole having a seat surface for a connection member 52, and the connection member 52 passes therethrough, and the connection member is screwed into the connection hole 23h2 of the second internal gear 23, so that the second cover 27 alone is connected to the second internal gear 23.

The input bearing 31 is disposed between the shaft portion 10B of the wave generator shaft 10 and the first cover 26. The first cover 26 rotatably supports the wave generator shaft 10 via the input bearing 31. The input bearing 32 is disposed between the shaft portion 10C of the wave generator shaft 10 and the second cover 27. The second cover 27 rotatably supports the wave generator shaft 10 via the input bearing 32.

The main bearing 33 includes the inner ring 33a, the outer ring 33b, and a rolling element 33c, and is disposed between the second internal gear 23 and the casing 24. The casing 24 rotatably supports the second internal gear 23 via the main bearing 33. In FIG. 1, a ball bearing is illustrated as the main bearing 33, but the main bearing 33 may be any type of bearing such as a roller bearing, a crossed roller bearing, an angular ball bearing, or a tapered bearing. Incidentally, the outer ring 33b of the main bearing 33 may be integrally formed with the casing 24.

Material of Each Member

The second internal gear 23 is made of a resin material. As the resin material, a resin alone or a resin containing reinforcing fibers can be applied, and, for example, various resin materials such as polyether ether ketone (PEEK) materials or POMs (polyacetal, polyoxymethylene, and the like) can be adopted. As the resin containing reinforcing fibers, a composite material such as carbon fiber reinforced plastics (CFRP), a composite material of a resin and another material, a baking material (a paper baking material, a cloth baking material, or the like), or the like can be applied. When the resin material is a resin alone, or when the contained reinforcing fibers are fibers that are not bound together in a cloth shape, injection molding or compression molding using the resin material can be performed. When the materials contained in the resin material are fibers that are bound together in a cloth shape or a piece shape, compression molding using the resin material can be performed.

The materials of the other members are not particularly limited, and in the present embodiment, the other members are formed as follows. The first internal gear 22, the casing 24, the first cover 26, and the second cover 27 are made of any of the above resin materials. Since the members are made of a resin, cost reduction and weight saving of the bending meshing type gear device 1 can be achieved.

The wave generator shaft 10, the external gear 12, and the spacer rings 36 and 37 are made of a metallic material such as a steel material. More specifically, the wave generator shaft 10 is made of, but not particularly limited to, a steel material such as chromium molybdenum steel. The external gear 12 is made of a steel material such as nickel chrome molybdenum steel. The spacer rings 36 and 37 are made of a steel material such as a high carbon chrome bearing steel material.

Description of Operation

When the wave generator shaft 10 is driven to rotate by the drive source such as a motor, a motion of the wave generator 10A is transmitted to the external gear 12. At this time, the external gear 12 is restricted by a shape following the outer peripheral surface of the wave generator 10A, and when viewed in the axial direction, is bent in an elliptical shape including a major axis portion and a minor axis portion. Further, the major axis portion of the external gear 12 meshes with the first internal gear 22 that is fixed. For this reason, the external gear 12 does not rotate at the same rotating speed as that of the wave generator 10A, and the wave generator 10A rotates relative to the external gear 12 there inside. Then, the external gear 12 is bendably deformed with the relative rotation such that a major axis position and a minor axis position move in the circumferential direction. The period of the deformation is proportional to the rotation period of the wave generator shaft 10.

When the external gear 12 is bendably deformed, the major axis position of the external gear 12 moves, so that the position of meshing between the external gear 12 and the first internal gear 22 is changed in the rotation direction. Here, for example, when it is assumed that the number of teeth of the external gear 12 is 100 and the number of teeth of the first internal gear 22 is 102, whenever the position of meshing makes one revolution, the teeth of meshing between the external gear 12 and the first internal gear 22 are shifted, and accordingly, the external gear 12 rotates. When the numbers of teeth are as described above, a rotary motion of the wave generator shaft 10 is reduced at a reduction ratio of 100:2 to be transmitted to the external gear 12.

Meanwhile, since the external gear 12 also meshes with the second internal gear 23, the position of meshing between the external gear 12 and the second internal gear 23 is also changed in the rotation direction by the rotation of the wave generator shaft 10. Here, when the number of teeth of the second internal gear 23 and the number of teeth of the external gear 12 are set to the same value, the external gear 12 and the second internal gear 23 do not rotate relative to each other, and a rotary motion of the external gear 12 is transmitted to the second internal gear 23 at a reduction ratio of 1:1. Therefore, the rotary motion of the wave generator shaft 10 is reduced at a reduction ratio of 100:2 to be transmitted to the second internal gear 23 and the second cover 27, and the rotary motion is output to the external member of the drive target.

Details of Second Internal Gear

Figure 2A:
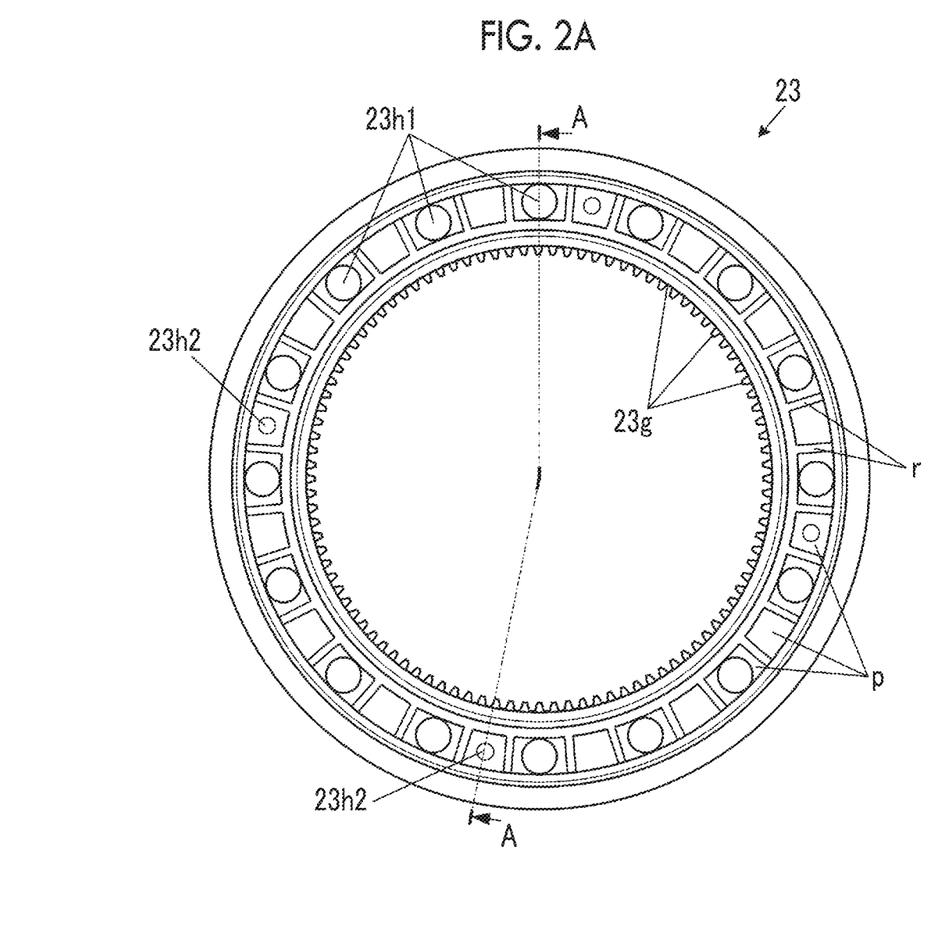
FIG. 2A is a plan view thereof.
Figure 2B:
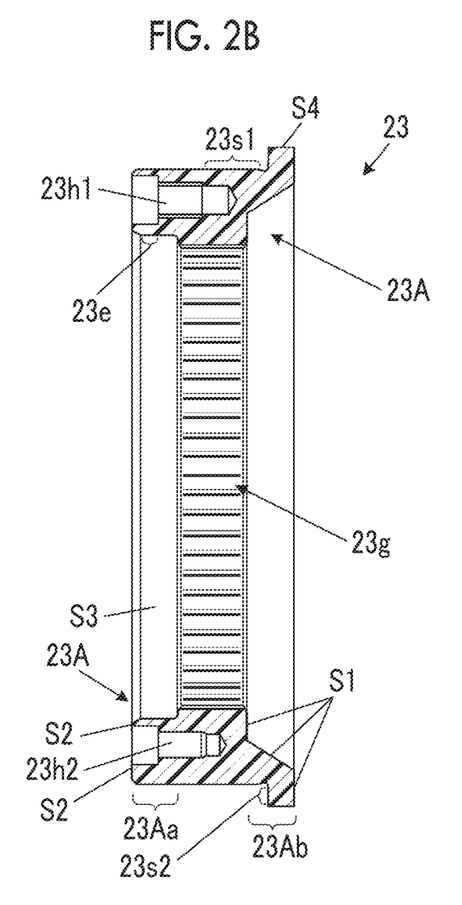
FIG. 2B is a cross-sectional view taken along line A-A.

FIGS. 2A and 2B illustrate the second internal gear according to the embodiment of the present invention, FIG. 2A is a plan view thereof, and FIG. 2B is a cross-sectional view taken along line A-A.

As illustrated in FIGS. 2A and 2B, the second internal gear 23 includes a flange portion 23A extending in the radial direction from the teeth 23g that are internal teeth. Since the teeth 23g are internal teeth, the flange portion 23A extends outward from the teeth 23g in the radial direction, but when the teeth 23g are external teeth, the flange portion 23A extends inward from the teeth in the radial direction. Further, the flange portion 23A includes extension portions 23Aa and 23Ab that extend from the position of the teeth 23g to the output side and the counter-output side in the axial direction, respectively. The extension portion 23Aa includes a plurality of ribs r having a plate shape and extending along the axial direction and the radial direction, and lightening portions p, each of which is a gap between the ribs r adjacent to each other. The output side of the lightening portion p is open. The connection holes 23h1 and 23h2 and the fitting surface 23e described above are provided on an extension portion 23Aa side of the flange portion 23A. The other extension portion 23Ab is provided with the contact surface 23s2 described above, and the mating surface 23s1 described above is provided on an outer periphery of the flange portion 23A including the extension portion 23Ab.

The second internal gear 23 includes a fluid solidified portion of which an outer surface is formed by solidifying a molten resin material (namely, a fluid material), and a cut portion of which an outer surface has been cut. The outer surface means a surface in contact with air when the second internal gear 23 is viewed alone. The cutting is a concept including grinding. A tool mark (tool trace) of a tool is added to the cut portion. On the other hand, the tool mark does not appear in the fluid solidified portion. The cut portion and the fluid solidified portion can be distinguished by whether or not the tool mark is present. Further, when the fluid solidified portion is formed by injection molding, some portions of the fluid solidified portion include the shapes of gate portions through which the molten resin material passes when a mold is filled therewith.

The cut portion includes the teeth 23g. The technique of cutting the teeth 23g is not particularly limited, and includes tooth forming via, for example, a gear shaper, a skiving cutter, a hob, or the like, and may include polishing via a grindstone.

The fluid solidified portion includes surfaces (portions) other than the cut portion. For example, the fluid solidified portion includes a surface S1 on the counter-output side and a surface S2 on the output side of the flange portion 23A, an inner peripheral surface S3 of the extension portion 23Aa, inner surfaces of the lightening portions p, the contact surface 23s2, an outer peripheral surface S4 of the extension portion 23Ab, surfaces other than the female screws of the connection holes 23h1 and 23h2, the mating surface 23s1, the fitting surface 23e, the female screws of the connection holes 23h1 and 23h2, and the like.

The fluid solidified portion is formed by, for example, injection molding, but may be formed by compression molding of a fiber reinforced resin. The outer shape of the fluid solidified portion is a shape along the mold.

Incidentally, one or more of the mating surface 23s1, the fitting surface 23e, and the female screws of the connection holes 23h1 and 23h2 may not be included in the fluid solidified portion but may be included in the cut portion. When the mating surface 23s1 or the fitting surface 23e is included in the cut portion, the cutting includes grinding by means of a grindstone or the like. When the mating surface 23s1 or the fitting surface 23e is cut, the dimensional accuracy of a fitting structure via the surface is improved.

The ratio of the area of the cut portion of the second internal gear 23 to that of the entire outer surface of the second internal gear 23 is, for example, 50% or less, and preferably 30% or less. Further, it is more preferable that only the teeth 23g is set as the cut portion, and a portion other than the teeth of a gear intermediate product (refer to a gear intermediate product IN in FIGS. 3B and 4) maintains the shape of the gear (second internal gear 23) as a finished product. A high processing accuracy of the cut portion can be obtained, whereas the cost is increased by an additional process. When the ratio of the area of the cut portion is set to the above ratio, it is possible to obtain a high processing accuracy of a required portion while maintaining an advantage of producing the second internal gear 23 at low cost.

Details of First Internal Gear

The first internal gear 22 includes a fluid solidified portion of which the outer surface is formed by solidifying a molten resin material, and a cut portion of which the outer surface has been cut. In the first internal gear 22, the cut portion includes the teeth 22g. The cut portion may include one or more of the female screws of the connection hole 22h1 and the fitting surfaces 22e1 and 22e2. A portion other than the cut portion corresponds to the fluid solidified portion of the first internal gear 22. The fluid solidified portion and the cut portion can be distinguished in the same manner as the method illustrated in the description of the second internal gear 23. Also in the first internal gear 22, the ratio of the area of the cut portion of the first internal gear 22 to that of the entire outer surface of the first internal gear 22 is, for example, 50% or less, and preferably 30% or less. Further, it is more preferable that only the teeth 22g is set as the cut portion, and a portion other than the teeth of a gear intermediate product maintains the shape of the gear (first internal gear 22) as a finished product.

Method for Producing Gear

Figure 3A:
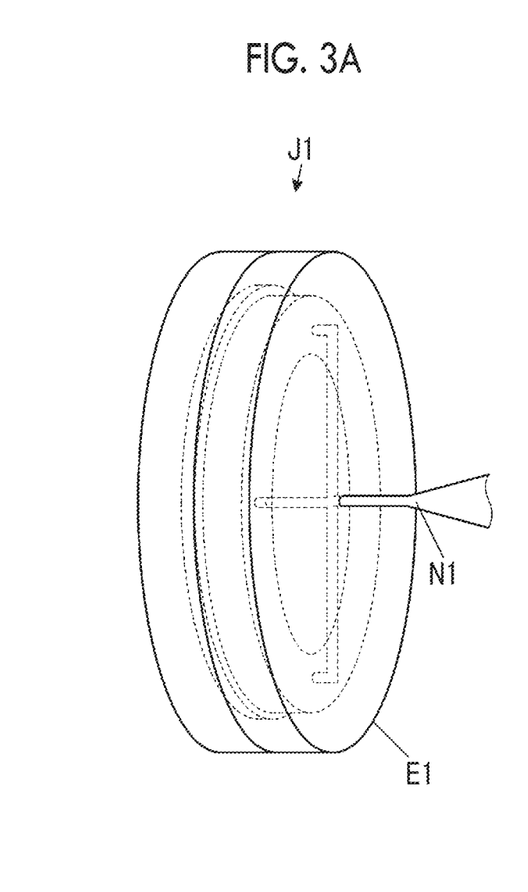
FIG. 3A illustrates an injection molding process.
Figure 3B:
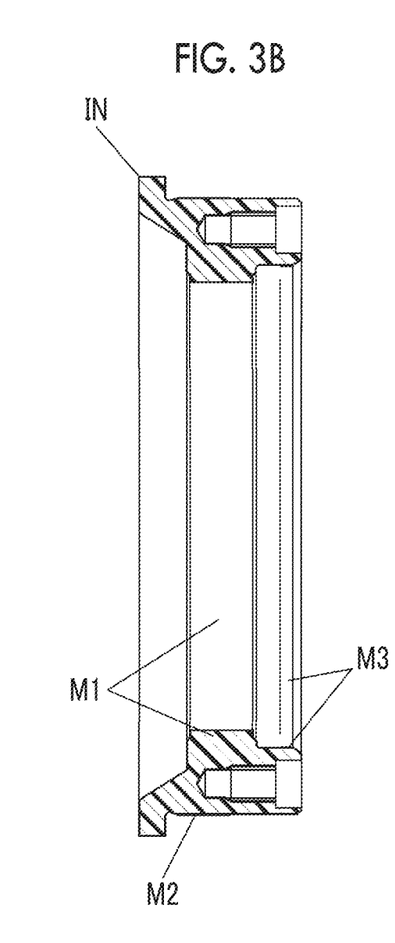
FIG. 3B illustrates a gear intermediate product that is released.
Figure 3C:
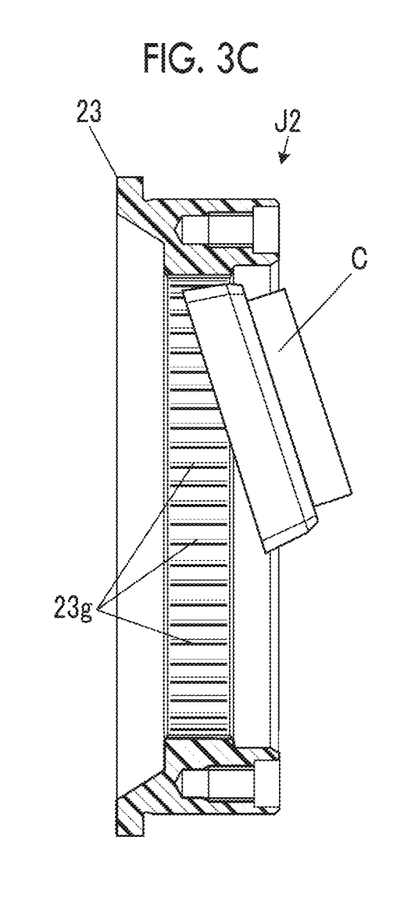
FIG. 3C illustrates a process of cutting teeth.
Figure 4:
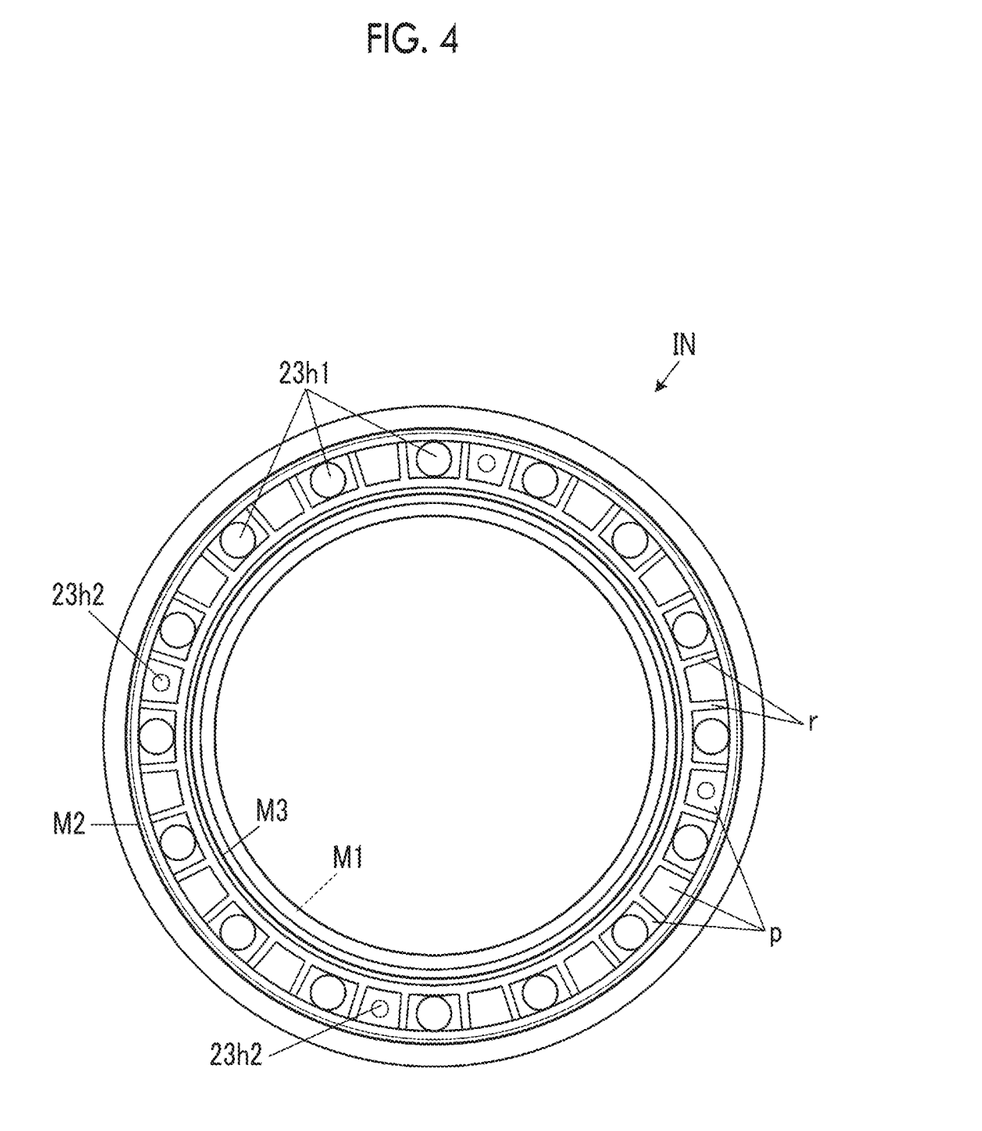
FIG. 4 is a plan view illustrating the gear intermediate product.

FIGS. 3A to 3C are views describing a process of producing the second internal gear, FIG. 3A illustrates an injection molding process, FIG. 3B illustrates a gear intermediate product that is released, and FIG. 3C illustrates a process of cutting teeth. FIG. 4 is a plan view illustrating the gear intermediate product.

The method for producing a gear in the present embodiment includes an intermediate product forming process J1 of solidifying a molten resin material which is a fluid material, to form the gear intermediate product IN as illustrated in FIGS. 3A and 3B, and a tooth forming process J2 of cutting the gear intermediate product IN to form the teeth 23g as illustrated in FIG. 3C.

The intermediate product forming process J1 is an injection molding process in which, as illustrated in FIG. 3A, the molten resin material is injected into a cavity of a mold E1 from an injection nozzle N1, and the resin material is solidified in the mold E1. When the mold E1 is opened and a molding product is released, the gear intermediate product IN having a shape along the cavity of the mold E1 can be obtained. Incidentally, a compression molding process may be applied to the intermediate product forming process J1. In the present embodiment, the resin material (for example, a PEEK material) may contain reinforcing fibers (for example, carbon fibers), and the material of the gear intermediate product IN may be a fiber reinforced resin.

As illustrated in FIGS. 3B and 4, the gear intermediate product IN includes a thick portion M1 in a portion that becomes the teeth 23g, the thick portion M1 being thicker than the teeth length of the teeth 23g in the radial direction, and has no concavities and convexities in a surface (inner peripheral surface). Incidentally, the thick portion M1 may include concavities and convexities corresponding to teeth bottoms and teeth tips of the teeth 23g, and may have a shape having a larger thickness than that of the teeth 23g in the radial direction. Since the concavities and convexities are formed in advance, the concentration of stress can be suppressed from occurring in the thick portion M1 during molding with the mold.

Further, for example, when a portion other than the teeth 23g, such as the mating surface 23s1 or the fitting surface 23e, is adopted as a target of the cutting process, thick portions M2 and M3 each having a thickness larger by the amount of cutting (the amount of grinding) are formed in the portion of the gear intermediate product IN. A portion other than the thick portions M1 to M3 has the same shape as that of the second internal gear 23 in a final form.

In the tooth forming process J2, as illustrated in FIG. 3C, the thick portion M1 (inner peripheral surface of the thick portion M1, in which concavities and convexities are not formed) of the gear intermediate product IN is cut by a gear shaper C to form the teeth 23g. Incidentally, in the tooth forming process J2, another tool such as a skiving cutter or a hob may be used, or a grinding process using a grindstone may be included.

The method for producing a gear in the present embodiment may further include a process of cutting a portion requiring a high dimensional accuracy. For example, in the cutting process, the mating surface 23s1 or the fitting surface 23e of the gear intermediate product IN is cut (grinding or the like using a grindstone). The process is performed before or after the tooth forming process J2, or in parallel with the tooth forming process J2.

The second internal gear 23 for the bending meshing type gear device 1 of the present embodiment is produced through a plurality of the above processes. The first internal gear 22 may be produced by the same processes as those described above. In addition, internal gears or external gears included in various gear devices may be produced by the same processes as those described above.

As described above, the method for producing a gear in the present embodiment includes the intermediate product forming process J1 of solidifying the fluid material to form the gear intermediate product IN, and the tooth forming process J2 of cutting the gear intermediate product IN to form the teeth 23g. In the intermediate product forming process J1, since the gear intermediate product IN is formed by solidifying the fluid material, an effect of lowering the production cost can be obtained. Meanwhile, even when the dimensional accuracy is decreased in the process of solidifying the fluid material, a portion for the teeth 23g can be processed with high accuracy by the tooth forming process J2. Therefore, a gear (second internal gear 23) applicable to a gear device with high accuracy can be produced at low production cost.

Further, according to the method for producing a gear in the present embodiment, in the intermediate product forming process J1, the gear intermediate product IN is formed by injection molding. The gear intermediate product IN can be formed at low cost and with a small variation in quality by injection molding. Therefore, the yield is improved, and a gear (second internal gear 23) applicable to a gear device with high accuracy can be produced at a lower production cost.

Further, according to the method for producing a gear in the present embodiment, the resin material contains reinforcing fibers. Therefore, a gear with high strength applicable to a gear device having a large torque can be produced. Here, it is assumed that the shape of the teeth 23g is also formed using a resin material containing reinforcing fibers by injection molding. In this case, in order to realize the fine shapes of the tooth tip and the tooth bottom, there are restrictions on the fiber length, for example, the distribution rate of the reinforcing fibers is decreased in the surface of the teeth 22g unless the fiber length is shortened. On the other hand, according to the method for producing a gear in the present embodiment, in the molding process of solidifying the resin material, the formation of the teeth 23g which are fine is not required, and the teeth 23g is formed by cutting. Therefore, even when long reinforcing fibers are used, a good fiber distribution can be obtained in the entirety of the teeth 23g. Therefore, a gear with high accuracy and high strength can be produced.

Further, according to the method for producing a gear in the present embodiment, the thick portion M1 in which the teeth 23g of the gear intermediate product IN is to be formed has a surface without concavities and convexities. Therefore, when the mold E1 is filled with a molten resin material, a portion for the thick portion M1 is easily filled therewith, and even when the resin material contains reinforcing fibers, the thick portion M1 is easily filled with the resin material with a good fiber distribution. As a result, the teeth 23g with high strength and a small variation in quality can be obtained through the cutting process thereafter.

Further, according to the method for producing a gear in the present embodiment, the second internal gear 23 for the bending meshing type gear device 1 is produced. The bending meshing type gear device 1 can realize a highly accurate operation with a small backlash due to the gear with high accuracy. Therefore, the second internal gear 23 with a light weight, high accuracy, and a reduction in cost produced by the production method of the present embodiment is applied, so that the bending meshing type gear device 1 with a light weight and high accuracy and at low cost can be realized.

The second internal gear 23 of the present embodiment includes the fluid solidified portion of which the outer surface is formed by solidifying a resin material, and the cut portion of which the outer surface has been cut. The cut portion includes the teeth 23g. Therefore, it is possible to realize the second internal gear 23 in which the teeth 23g has a high dimensional accuracy while a cost reduction is achieved by the fluid solidified portion. Further, the bending meshing type gear device 1 including the second internal gear 23 can realize a highly accurate operation while achieving weight saving and cost reduction of the device.

The embodiment of the present invention has been described above. However, the present invention is not limited to the embodiment. For example, in the method for producing a gear according to the embodiment, an example where a fluid material is injection molded to form the gear intermediate product IN has been illustrated. However, the intermediate product forming process may adopt any molding method such as compression molding or molding by 3D printers as long as a fluid material (including a case where a powder or granular material is melted into a fluid) is solidified to form the gear intermediate product. In addition, in the method for producing a gear according to the embodiment, the mating surface 23s1 to which the inner ring 33a of the main bearing 33 is fixed has been illustrated as a surface to be cut; however, when there is a mating surface to which the outer ring of the bearing is fixed, the surface may be a cutting target. In addition, all the connection holes may be cutting targets. Further, in the embodiment, a resin material has been illustrated as the fluid material forming the gear; however, for example, the gear intermediate product may be formed from molten metal such as molten aluminum and molten iron by molding methods such as aluminum die casting, casting, and 3D printers. Even in this case, since the process of solidifying the fluid material to perform molding is included, while the cost reduction of the gear is achieved, the high accuracy of the dimensions and shape of the teeth can be realized by the tooth forming process by cutting. In the embodiment, the internal gear for the bending meshing type gear device has been described as an example; however, the gear which is a target of the present invention is not particularly limited, and the present invention can also be applied to, for example, an external gear or a perpendicular gear. In addition, changes can be made to the detailed parts illustrated in the embodiment without departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A bending meshing gear device comprising:
   a wave generator;
   an external gear that is bendably deformed by the wave generator; and
   an internal gear that meshes with the external gear,
   wherein the internal gear includes a fluid solidified portion of which an outer shape is formed by solidifying a fluid material, and a cut portion which has been cut,
   the cut portion includes teeth,
   the internal gear includes a flange portion extending in a radial direction from the teeth,
   the flange portion includes extension portions that extend from a position of the teeth to an output side and a counter-output side in an axial direction, respectively,
   the extension portion includes a plurality of ribs extending along the axial direction and the radial direction, and lightening portions, each of which is a gap between the ribs adjacent to each other, and
   an output side of the lightening portion is open.

2. The bending meshing gear device according to claim 1, further comprising:
   a wave generator bearing that is disposed between the wave generator and the external gear.

3. The bending meshing gear device according to claim 2,
   wherein the wave generator bearing includes a plurality of rolling elements, and a retainer that retains the plurality of rolling elements, and
   restricting members that restrict movement of the retainer and the external gear in the axial direction are provided on both sides in the axial direction of the retainer and the external gear.

4. The bending meshing gear device according to claim 1,
   wherein a ratio of an area of the cut portion to an area of an entire outer surface of the internal gear is about 50% or less.

5. The bending meshing gear device according to claim 1,
   wherein in the wave generator, an outer shape of a cross section perpendicular to a rotation axis is an elliptical shape.

6. The bending meshing gear device according to claim 1,
   wherein the external gear has a shape following an outer peripheral surface of the wave generator, and
   the external gear is bent in an elliptical shape including a major axis portion and a minor axis portion.

7. The bending meshing gear device according to claim 1, further comprising:
   a first cover that covers an outer peripheral portion on a counter-output side of a wave generator shaft including the wave generator; and
   a second cover that covers an outer peripheral portion on an output side of the wave generator shaft.

8. The bending meshing gear device according to claim 7,
   wherein the first cover and the second cover include holes that communicate with the internal gear.

9. The bending meshing gear device according to claim 1,
   wherein the internal gear is made of a resin material, and the external gear is made of a metallic material.

10. A method for producing the bending meshing gear device according to claim 1, the method comprising:
    an intermediate product forming process of solidifying a fluid material to form a gear intermediate product; and
    a tooth forming process of cutting the gear intermediate product to form the teeth.

11. The method for producing the bending meshing gear device according to claim 10,
    wherein in the intermediate product forming process, a resin material is injection molded to form the gear intermediate product.

12. The method for producing the bending meshing gear device according to claim 11,
    wherein the resin material contains a reinforcing fiber.

13. The method for producing the bending meshing gear device according to claim 10,
   wherein in the intermediate product forming process, a surface without concavities and convexities is formed in a portion in which the teeth are to be formed, and in the tooth forming process, the teeth are formed in the surface without concavities and convexities.

14. The method for producing the bending meshing gear device according to claim 10,
   wherein a portion other than the teeth of the gear intermediate product maintains a shape of a gear as a finished product.

15. The method for producing the bending meshing gear device according to claim 10,
   wherein the internal gear for the bending meshing gear device is produced.

16. The method for producing the bending meshing gear device according to claim 10,
   wherein in the intermediate product forming process, concavities and convexities corresponding to teeth bottoms and teeth tips are formed in a portion in which the teeth are to be formed.

\* \* \* \* \*